United States Patent [19]

Hino et al.

[11] Patent Number: 4,794,505
[45] Date of Patent: Dec. 27, 1988

[54] A METHOD OF OPERATING A POWER SUPPLY SYSTEM INCLUDING INVERTER STAGE

[75] Inventors: Hirofumi Hino, Noda; Hideki Uemura, Kashiwa; Kazuo Kaneko, Omiya, all of Japan

[73] Assignee: Hitachi Medical Corporation, Tokyo, Japan

[21] Appl. No.: 125,746

[22] Filed: Nov. 19, 1987

Related U.S. Application Data

[62] Division of Ser. No. 851,736, Apr. 14, 1986, abandoned.

[30] Foreign Application Priority Data

Apr. 15, 1985 [JP] Japan .................. 60-78360
Jan. 16, 1986 [JP] Japan .................. 61-5035

[51] Int. Cl.⁴ .......................... H02M 3/335
[52] U.S. Cl. ...................... 363/17; 363/25; 363/97; 363/132; 363/134; 378/107
[58] Field of Search ............. 363/17, 24, 25, 97, 363/98, 131, 132, 133, 134; 378/91, 107

Primary Examiner—Patrick R. Salce
Assistant Examiner—Anita M. Ault
Attorney, Agent, or Firm—Antonelli, Terry & Wands

[57] ABSTRACT

A power supply system including a DC-to-AC inverter stage and a voltage step-up transformer is intended to have the output voltage settlement with a minimal delay and suppressed bounce at the start-up of power supply to the load, and also intended to reduce the load voltage bounce caused by the leakage inductance and stray capacitance of a high tension step-up transformer.

5 Claims, 12 Drawing Sheets

FIG. 1 PRIOR ART
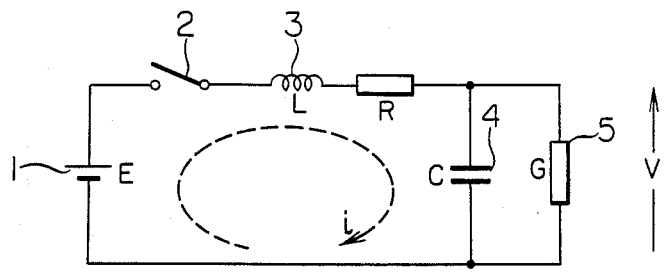
FIG. 2 PRIOR ART
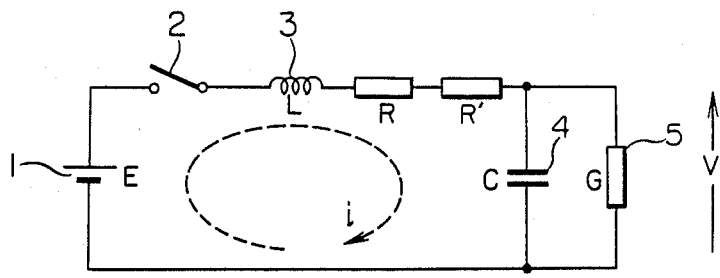
PRIOR ART
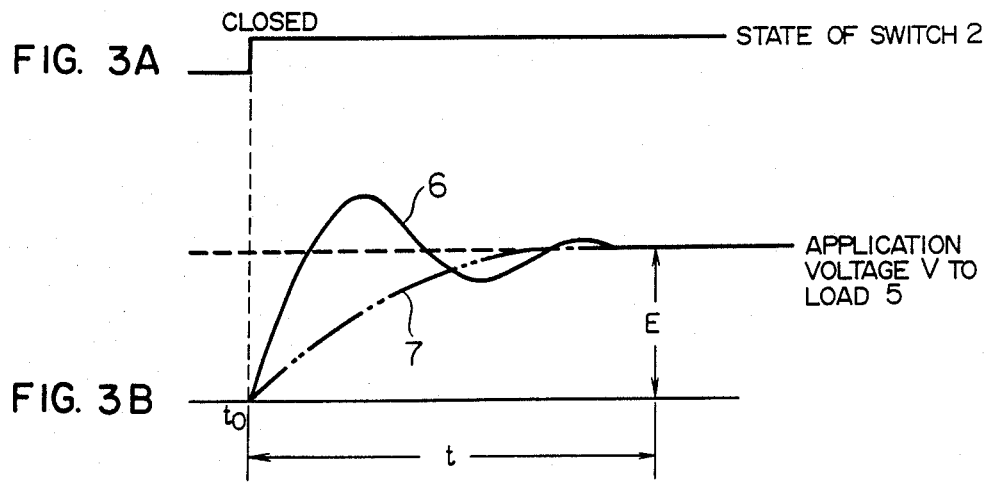

A METHOD OF OPERATING A POWER SUPPLY SYSTEM INCLUDING INVERTER STAGE

This application is a divisional of application Ser. No. 851,736, filed Apr. 14, 1986 now abandoned.

BACKGROUND OF THE INVENTION

This invention relates to an inventer-driven power supply system which transfers electric power from a d.c. power source to a load in parallel connection with a capacitor through an inductive circuit element and, particularly, to a power supply system which is capable of settling the load application voltage to the specified voltage without delay at the start-up of power supply and suppressing the oscillation of the application voltage.

There has been known this type of inverter system made up in serial connection of a d.c. power source 1 having terminal voltage E, a switch 2, a circuit element, e.g. a winding 3 having inductance L, and a load 5 having conductance G in parallel connection with a capacitor 4 having capacitance C, as shown in FIG. 1. The serial circuit includes a resistive component R for the wiring. In the above circuit arrangement, when the switch 2 is closed at time point $t_o$ as shown in FIG. 3, to supply power to the load 5, the current i flows along the route from 1 to 2 to 3 to R to 4 and 5 in parallel, and back to 1, and power supply to the load 5 commences. At this time, the application voltage V to the load 5 rises as shown by the solid line 6 in FIG. 3B and the voltage is often oscillatory during the transitional period until the current i settles to the stationary state. There are three cases of transient response for the circuit shown in FIG. 1 depending on the values of the inductance L, resistance R, capacitance C and conductance G, as follows.

(1) Aperiodic damping response, in case of:

$$\frac{1}{4}\left(\frac{R}{L} - \frac{G}{C}\right)^2 > \frac{1}{LC}$$

(2) Critical damping response, in case of:

$$\frac{1}{4}\left(\frac{R}{L} - \frac{G}{C}\right)^2 = \frac{1}{LC}$$

(3) Oscillatory response, in case of:

$$\frac{1}{4}\left(\frac{R}{L} - \frac{G}{C}\right)^2 < \frac{1}{LC}$$

For the inverter system shown in FIG. 1, the resistance R is made as small as possible, in general, so as to achieve a high power transmission efficiency. On this account the voltage is apt to oscillate as categorized in case (3). IN order for the conventional power supply system to suppress the oscillation of the application voltage to the load 5, it includes a resistance R' large enough to suppress the voltage oscillation in series to the resistance R when the switch 2 is closed to commence power supply as shown in FIG. 2 and then shunts the resistance R' after the voltage has settled to the stationary state.

Although this power supply system is capable of suppressing the oscillation of application voltage V to the load 5 at the commencement of power supply by the effect of the resistance R' as shown by the dash-dot line in FIG. 3B, voltage rise time until the application voltage V reaches a certain voltage level, e.g., the terminal voltage E of the d.c. power source 1, is delayed significantly. Therefore, the system is not applicable to some types of load 5 where the allowable voltage rise time t is restricted.

Next, the conventional power supply system with its load being an X-ray generator will be described with reference to FIGS. 4 to 7. A typical conventional X-ray generator receives the commercial a.c. power voltage, and the voltage is adjusted in such a way of selecting the position of the slide brush on the secondary winding of a voltage control transformer, raised by a step-up transformer, rectified into a d.c. voltage, and applied to an X-ray tube.

Recently, inverter-driven X-ray generators have been developed by utilization of the advanced power control semiconductor devices. Owing to the use of such power control semiconductor devices, the inverter-driven X-ray generator is incomparably faster in power control than the first-mentioned one using a voltage control transformer, allowing the easy and accurate tube voltage adjustment during the X-ray emission.

FIG. 4 shows the circuit arrngement of the conventional inverter-driven X-ray generator. The system includes a d.c. power source 31 providing input power to the inverter, transistors 32–35 each becoming conductive in response to the base current so as to convert the d.c. voltage into an a.c. voltage through the alternating states of conductive transistors 33 and 34 and conductive transistors 32 and 35, and diodes 36–39 connected in antiparallel fashion to the respective transistors 32–35 for the purpose of retrieving energy held in the circuit back to the d.c. power source 31, the components 32–39 in combination constituting an inverter. The system further includes a step-up transformer 40 for raising the output voltage of the inverter, diodes 41–44 constituting a full-bridge inverter circuit, and a capacitive component 45 which actually exists distributively on a high-tension cable connecting the rectifier output to an X-ray tube 46.

The step-up transformer 40 has a large turn ratio, with the secondary winding being placed on multiple layers, which allows the stray capacitance to exist between the layers as shown by the equivalent circuit of the transformer 40 in FIG. 5A. The equivalent circuit is further simplified as shown in FIG. 5B. The transformer is equivalently expressed by itself as a combination of leakage inductances $L_{l1}$ and $L_{l2}$ and an exciting inductance $L_{ex}$, and the transformer with the stray capacitance Cs on its secondary winding has the equivalent circuit shown in FIG. 5C. Under the evident conditions $L_{l1} < < L_{ex}$ and $L_{l2} < < L_{ex}$ and on the assumption $L_l = L_{l1} + L_{l2}$, the equivalent circuit of the step-up transformer 40 is simplified as shown in FIG. 5D.

FIG. 6 shows the inverter-driven X-ray generator derived from FIG. 4, but with the step-up transformer 40 being replaced with its equivalent circuit including the leakage inductance $L_l$ and stray capacitance $C_s$ shown in FIG. 5D. The components 51–59 and 61–66 are all counterparts of FIG. 4.

The operation of the system shown in FIG. 6 will be described by making reference to the waveform diagram of FIG. 7. When the transistors 52 and 55 are made conductive by the base currents a and d, respectively, the load current $i_f$ flows through the route from 51 to 52 to $L_l$ to 61 to 65 and 66 in parallel, to 64 to 55, and back to 51, and power is supplied to the load. At this time, the stray capacitance $C_s$ is charged in polarity as shown in FIG. 6. When the base currents a and d cease at time point $t_o$ in FIG. 7, causing the transistors 52 and 55 to cut off, the load current $i_f$ falls to zero. Following a halt period which is provided so that the transistors 53 and 55 (or 52 and 54) are not conductive simultaneously, the base currents b and c are supplied at time point $t_1$ to make the transistors 53 and 54 conductive. During the period from $t_o$ to $t_1$ the stray capacitance $C_s$ retains the polarity of charge as shown in FIG. 6. Accordingly, when the transistors 53 and 54 become conductive at $t_1$, the current flows through the route from 51 to 53 to $C_s$ to $L_l$ to 54, and back to 1 as shown by the dashed line in FIG. 6, and the stray capacitance $C_s$ is charged reversely. This reverse charging takes place in a resonance circuit including the leakage inductance $L_l$ and stray capacitance $C_s$ which are energized by the voltage of the d.c. power source 51 plus the voltage of the stray capacitance $C_s$, causing the creation of an excessive oscillatory current. Therefore, the load current $i_f$ becomes oscillatory as shown in FIG. 7. The oscillating currett has a peak value $i_{lP}$, which is expressed in terms of the voltage E of the d.c. power source 51 and the voltage V of the stray capacitance $C_s$ as follows.

$$i_{lP} = (E + V)\sqrt{\frac{C_s}{L_l}} \qquad (1)$$

Since the voltage V is nearly equal to E at time point $t_o$, the above equation is reduced to at this time point as follows.

$$i_{lP} = 2V\sqrt{\frac{C_s}{L_l}} \qquad (2)$$

The voltage V of the stray capacitance $C_s$ reaches the maximum at time point $t_2$ when the first half-cycle of the oscillating current completes, and it is higher than the voltage of the d.c. power source 51. The voltage $V_x$ applied to the X-ray tube 66 and the elecrostatic capacity 65 existing on the high tension cable is equal to the voltage V of the stray capacity $C_s$, and it is maximum at time point $t_2$. The voltage $V_x$ created by the oscillation of current in the leakage inductance $L_l$ and stray capacitance $C_s$ is in excess of the voltage which would be raised from the voltage of the d.c. power source 51 by the turn ratio of the step-up transformer 40. Thereafter, the stray capacitance $C_s$ is discharged through the route from $C_s$ to 57 to 51 to 58 to $L_l$, and back to $C_s$, and power is returned to the power source instead of being supplied to the load. The only power supply to the X-ray tube 66 owes to the discharging of the electrostatic capacity 65 existing on the high tension cable, and the voltage $V_x$ falls as shown in FIG. 7. The oscillation of the load current diminishes progressively, and the stray capacitance $C_s$ is charged in polarity opposite to that shown in FIG. 6 at time point $t_3$ when the transistors 53 and 54 are cut off. An operating cycle completes, and the same cycle takes place iteratively.

The stray capacitance of the step-up transformer is charged each time the polarity of the inverter output voltage reverses, with the polarity of charging being consistent to the output voltage polarity. The charging current becomes an oscillating current due to the leakage inductance of the step-up transformer, resulting in an enlarged pulsation on the tube voltage waveform in excess of the inverter output voltage multiplied by the step-up ratio of the transformer.

The current flowing through the transistors 52–55 is the load current added by the oscillating current, and therefore these switching devices need to be chosen in consideration of the peak current. It is required that the oscillating current caused by the leakage inductance and stray capacitance of the step-up transformer does not adversely affect the tube voltage waveform.

The prevention of load current oscillation caused by the leakage inductance of the step-up transformer and the electrostatic capacity of the high tension cable in the inverter-driven X-ray generator as described above is disclosed in Japanese Patent Unexamined Publication No. 57-53100, in which a resistor is inserted in the circuit so as to provide a damping effect.

SUMMARY OF THE INVENTION

An object of this invention is to provide an inverter-driven power supply system which is capable of settling the load application voltage to the specified voltage level without delay at the commencement of power supply and providing a stable load voltage waveform with reduced pulsation caused by the leakage inductance and stray capacitance of a step-up transformer.

The principle of the inventive inverter-driven power supply system will first be described with reference to FIGS. 8 and 9. The power supply system is made up of a serial connection of a d.c. power source 81 having terminal voltage E, a first switch 82, a circuit element, e.g. a winding 83 having inductance L, and a load 85 having conductance G in parallel connection with a capacitor 84 having capacitance C, and it is further provided with a second switch 88 connected in parallel to a serial connection of the winding 83 and the capacitor-load coupling 84 and 85. The serial circuit includes a resistive component R for the wiring.

In the above circuit arrangement, power is supplied from the d.c. power source 81 to the load 85 by initially closing the first switch 82 at time point $t_o$ as shown in FIG. 9 (A). Then, the current flows through the route from 81 to 82 to 83 to R to 84 and 85 in parallel, and back to 81 in FIG. 8, and power supply to the load 85 commences. The application voltage to the load 85 rises as shown by the solid line in FIG. 9 (C), and it is apt to overshoot the voltage level E and oscillate as shown by the dashed line as in the case shown by the solid line 6 in FIG. 3B. In this circuit arrangement, when the application voltage V to the load 85 has become equal to a certain voltage level, e.g., the voltage E of the d.c. power source 81, at time point $t_1$, the first switch 82 is opened, as shown in FIG. 9 (A), and simultaneously the second switch 88 is closed, as shown in FIG. 9 (B). During the period from $t_o$ to $t_1$ the current i flowing in the inductance L of the winding 83 rises as shown by the solid line 12A in FIG. 9 (D), and it becomes higher than the steady state level i=E/R (or i=EG). Electromagnetic energy created by the varying current causes the current i to flow through the route from 83 to R to 84 and 85 in parallel, to 88, and back to 83 in FIG. 8. Since the first switch 82 in the open state seases to supply power from the d.c. power source 81, the only power supply to the load 85 is the electromagnetic energy possessed by the inductance L, and the current falls sharply as shown by the solid line 13A in FIG. 9 (D). At this time, the voltage across the capacitor 84 does not change significantly because of its discharging to the load 85 being comparable with charging by the inductance L.

In this situation when the current flowing in the inductance L has become equal to the steady state value EG at time point $t_2$, as shown in FIG. 9 (D), the second switch 88 is opened, as shown in FIG. 9 (B), and simultaneously the first switch 82 is closed, as shown in FIG. 9 (A). Then, the current i flows again through the route from 81 to 82 to 83 to R to 84 and 85 in parallel, and back to 81 in FIG. 8. At this time, the voltage across the capacitor 84 does not change significantly from the level substantially equal to E, as shown by the solid line 11A in FIG. 9 (C), and the current i in the inductance L stays at the steady state value EG, as shown by the solid line 14A in FIG. 9 (D), causing less energy transfer between the winding 83 having inductance L and the capacitor 84 having capacitance C, and the application voltage V to the load 85 does not oscillate as shown in FIG. 9 (C). In consequence, the inventive power supply system is operative to settle the application voltage V to the load 85 to the specified voltage level E with a minimal delay at the commencement of power supply as shown by the solid line 9A in FIG. 9 (C) and with well suppressed pulsation as shown by the solid line 11A. Proper switching of the switching 82 and 88 can be controlled by any well known timing control circuitry 1A.

The aforementioned prior ar problems are derived from the facts that the leakage inductance and stray capacitance of a step-up transformer cannot physically be nullified, and that the stray capacitance of the transformer is charged in opposite polarity each time the inverter output voltage reverses its polarity. The present invention was made by contemplating these facts, and it is intended to make charging of the stray capacitance out of phase with power supply from the inverter to the load, and to provide halt periods such as those between $t_o$ and $t_1$ and between $t_3$ and $t_4$ in FIG. 7 when the power transfer from the inverter to the load is absent, i.e., when the inverter output voltage makes a transition in its polarity, during which periods the polarity of charging for the stray capacitance is reversed. Reversing the voltage polarity across the stray capacitance in advance of the reversal of the inverter output voltage polarity eliminates reverse charging of the stray capacitance and thus prevents the load current from oscillating, whereby the adverse affect of the transient circuit operations on the load voltage waveform can be eliminated.

BRIEF DESCRIPTION OF THE DRAWINGS

FIGS. 1 and 2 are schematic circuit diagrams explaining the principle of the conventional inverter-driven power supply systems;

FIGS. 3a and 3b are sets of timing graphs showing the operation of the above systems;

DESCRIPTION OF THE PREFERRED EMBODIMENTS

Embodiments of the present invention will now be described with reference to the accompanying drawings.

Figure 10:
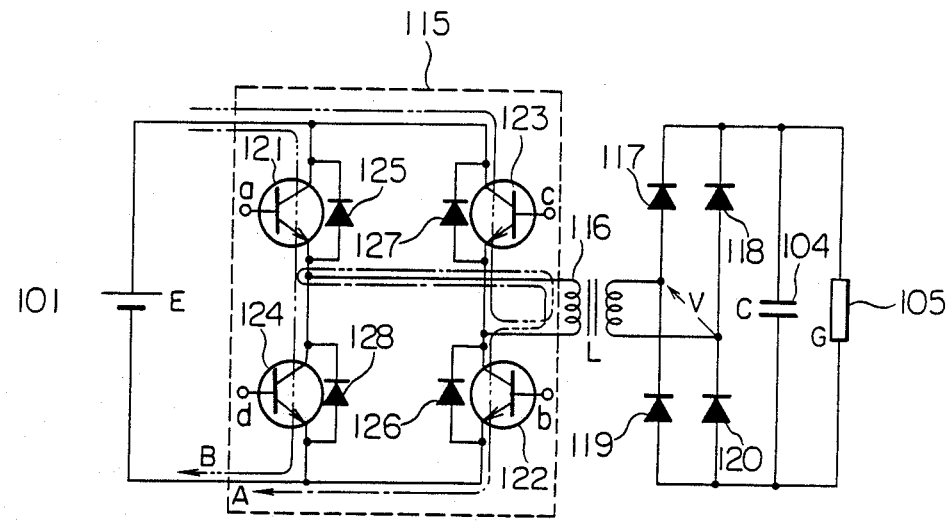
FIG. 10 is a schematic circuit diagram showing the first embodiment of this invention.

FIG. 10 shows the first embodiment of this invention, in which the power supply system includes a d.c. power source 101 providing terminal voltage E, a full-bridge inverter 115, a circuit element, e.g. a transformer 116 having inductance L, diodes 117–120 constituting a full-bridge rectifier, and a load 105 having conductance G in parallel connection with a capacitor 104 having capacitance C for smoothing the full-bridge rectified voltage. The inverter 115 is intended to invert d.c. power from the d.c. power source 101 into a.c. power as a stage of power supply to the load 105, and it consists of transistors 121, 122, 123 and 124 which are made conductive by the base current a, b, c and d, respectively, and protective fly-wheel diodes 125, 126, 127 and 128 connected in antiparallel fashion across the corresponding transistors 121–124. The transistors 121 and 122 in combination form a current path A of the inverter 115, while the transistors 123 and 124 in combination form another current path B. The inverter 115 provides a.c. power for the load 105 in such a way that simultaneous conduction of the transistors 121 and 122 on the current path A and simultaneous conduction of the transistors 123 and 124 on the current path B take place alternately and interactively. A halt period is provided between the conducting operations of the current paths A and B so that both transistor pairs on the current paths A and B do not become conductive simultaneously.

Figure 8:
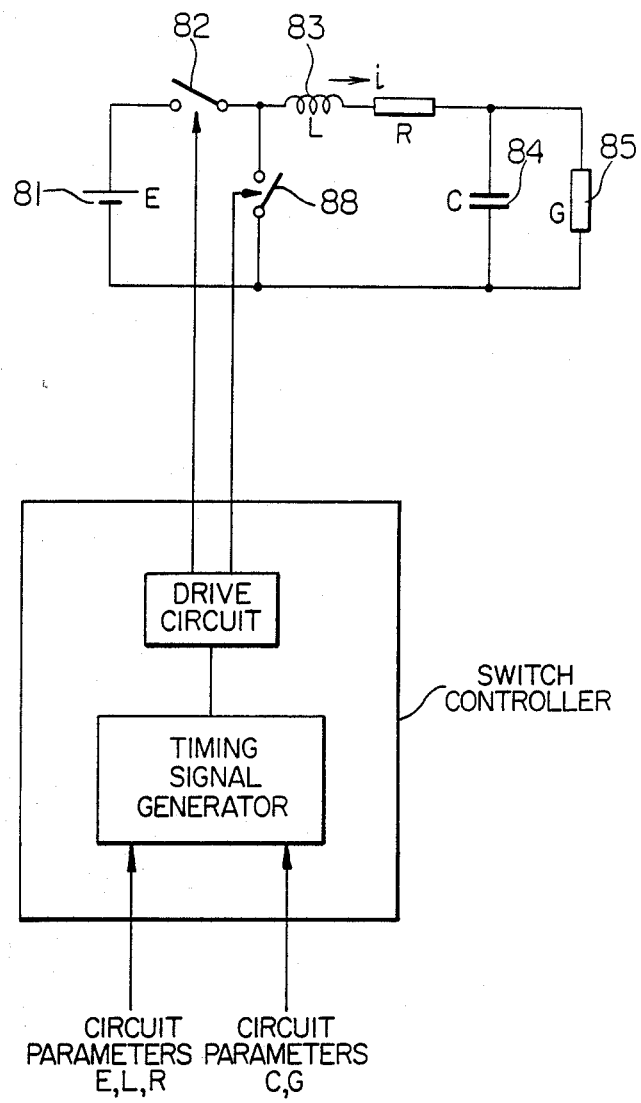
FIG. 8 is a schematic circuit diagram explaining the principle of the inventive inverter-driven power supply system.
Figure 9:
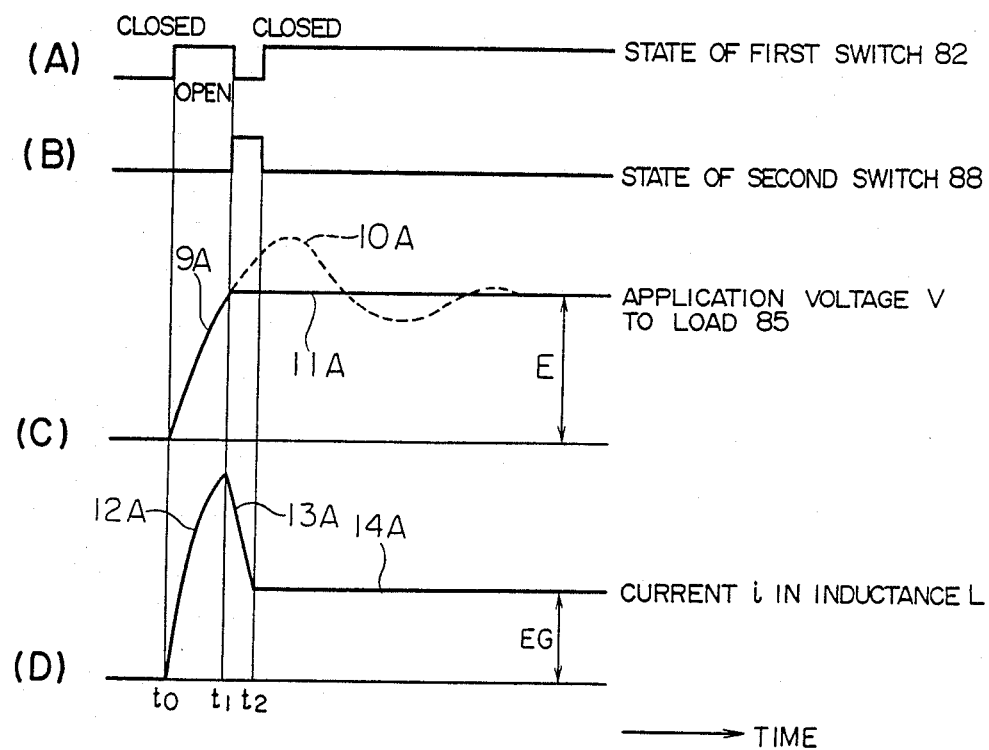
FIG. 9 is a set of waveform diagrams used to explain the operation of the circuit shown in FIG. 8.

The full-wave bridge inverter 115 serves for the first switch 82 and second switch 88 in FIG. 8. Namely, conduction of the transistor pair 121 and 122 on the current path A allows the load current to flow from the d.c. power source 101 via components 121, L and 117 to the capacitor 104 and load 105, and back to the d.c. power source 101 via the components 120 and 122 as shown by the dash-dot line in FIG. 11. This operation is identical to the case of FIG. 8 with the current i flowing through the route from 81 to 82 to 83 to R to 84 and 85 in parallel, and back to 81, where the transistor 121 in FIG. 10 serves for the first switch 82 in FIG. 8 and the diode 128 serves for the second switch 88. Similarly, conduction of the transistor pair 123 and 124 on the current path B allows the load current to flow from the d.c. power source 101 via the components 123 and 118 to the capacitor 104 and load 105, and back to the d.c. power source 101 via the components 119, L and 124 as shown by the dashed line in FIG. 11. This operation is identical to the case of FIG. 8 with the current i flowing through the route from 81 to 82 to 83 to R to 84 and 85 in parallel, and back to 81, where the transistor 123 serves for the first switch 82 and the diode 126 serves for the second switch 88. It is possible for the current path A to let the tranistor 122 and the diode 127 serve for the first and second switches 82 and 88, respectively, and for the current path B to let the transistor 124 and diode 125 serve for the first and second switches 82 and 88, respectively.

Figure 11:
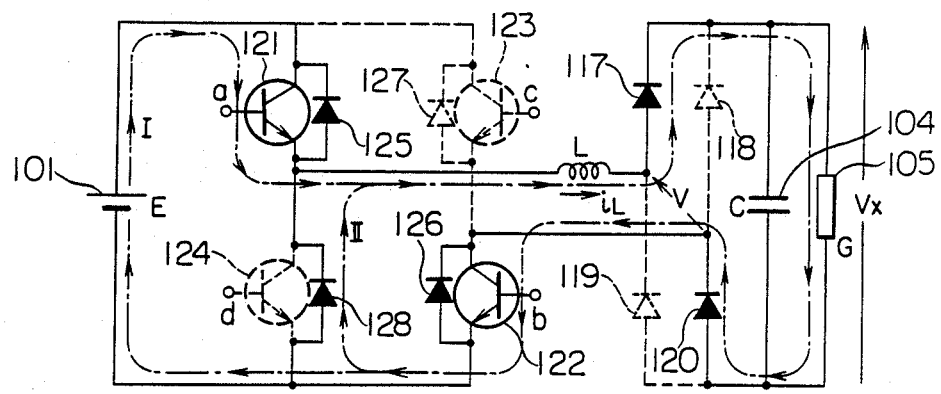
FIG. 11 is a diagram used to explain the inverting operation of the full-bridge inverter shown in FIG. 10.
Figure 12:
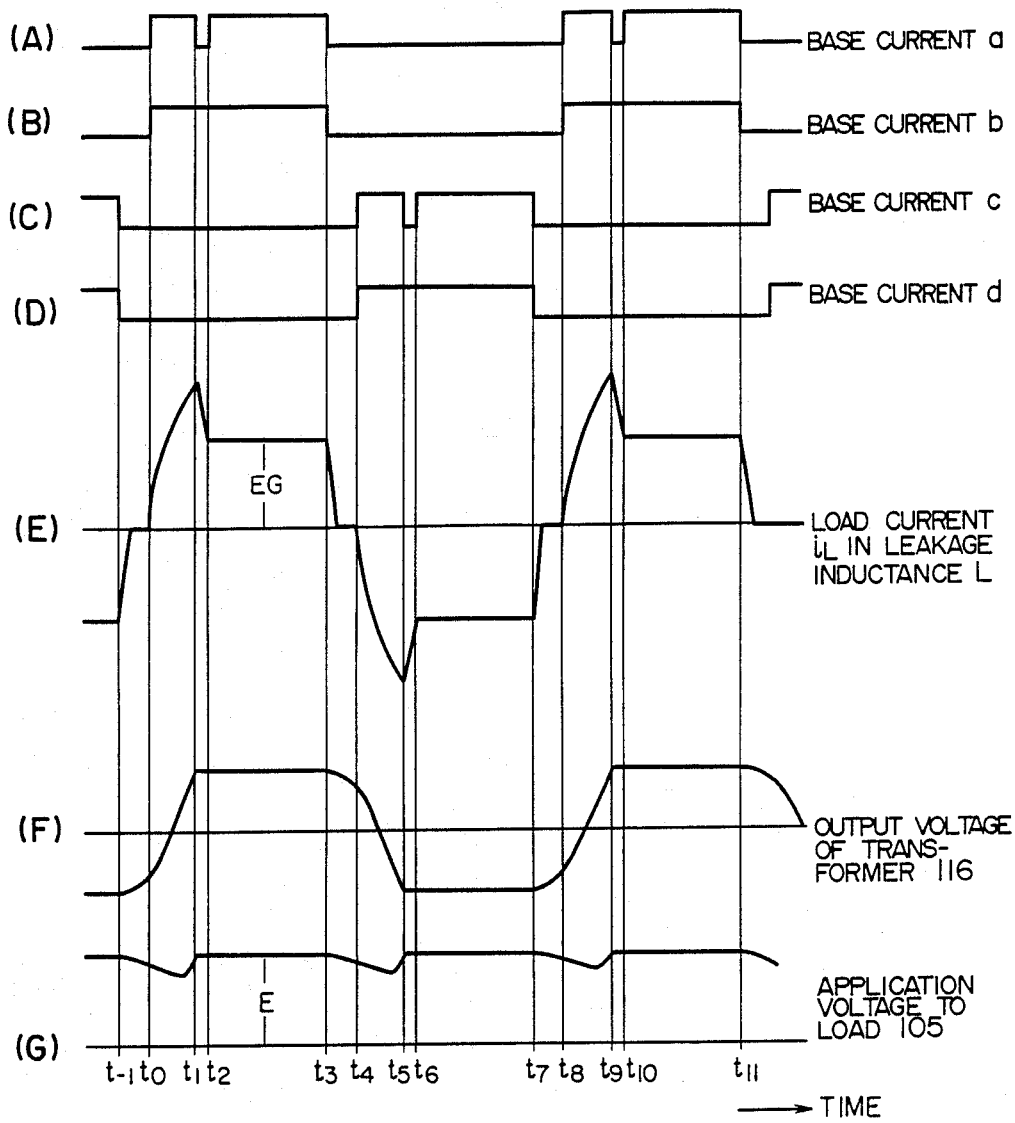
FIG. 12 is a set of timing graphs showing the operation of the circuit arrangement shown in FIG. 10.

Next, the operation of the above circuit arrangement will be described with reference to FIG. 11 showing the current flow as part of the inverting operation of the full-bridge inverter 115 and to FIG. 12 showing the partinent timing relationship. The component L in FIG. 11 represents the leakage inductance of the transformer 116 in FIG. 10, whose parameters on the secondary winding are evaluated in terms of the primary ones in accordance with the turn ratio n.

Initially, the base currents a and b are applied to the transistors 121 and 122 at time point $t_o$, as shown in FIG. 12 (A) and (B), and both transistors become conductive. This cause a current to flow on one current path A in the inverter 115, attributing the onstate of the first switch 82 in FIG. 8. Consequently, the current flows through the route from 101 to 121 to L to 117 to 104 and 105 in parallel, to 120 to 122, and back to 101 (will be termed "loop I"), as shown by the dash-dot line in FIG. 11 and power supply to the load 105 commences. The load current $i_l$ increases sharply by the effect of the leakage inductance L of the transformer 116 and the capacitance C of the capacitor 104, as shown in FIG. 12 (E), and the output voltage V of the transformer 116 varies in the direction to the opposite polarity with respect to the state preceding the time point $t_o$, as shown in FIG. 12 (F).

The period immediately preceding the time point $t_o$, i.e., between $t_{-1}$ and $t_o$, is set as a halt period as shown in FIG. 12 (A) through (D) so as to protect the transistors 121–124 from destruction which would occur by shunting the load by themselves if they were to become conductive simultaneously. During the period from $t_{-1}$ to $t_o$, the d.c. power source 101 ceases to supply power to the load 105, which is merely supplied with power by discharging of the capacitor 104, and the voltage across the capacitor 104 (substantially equal to $V_x$) falls. Following the time point $t_o$, the output voltage v of the transformer 116 rises in opposite polarity, and when the output voltage v' (v' =v/n) shown in FIG. 11 has become equal to the falling voltage across the capacitor 104, the capacitor 104 is charged again.

At time point $t_1$ when the application voltage $V_x$ to the load 105 has reached a certain voltage level, e.g., the terminal voltage E of the d.c. power source 101, the base current a is removed as shown in FIG. 12 (A) so that the transistor. 121 on the current path A is cut off. The diode 128 in antiparallel connection with the transistor 124 is forwardly biased to conduct the current. This circuit condition is equivalent to the circuit of FIG. 8 with the first switch 82 being in the off-state and the second switch 88 being in the onstate. Consequently, the current which has been flowing in the loop I becomes to flow through the route from L to 117 to 104 and 105 in parallel, to 120 to 122 to 128, and back to L (this current route will be called "loop II"). In this circuit condition, the d.c. power source 101 does not supply power, and only power source t the load 105 is electromagnetic energy held in the inductance L and discharging from the capacitor 104. Then, the load current $i_L$ flowing through the leakage inductance L diminishes sharply.

At time point $t_2$ when the load current $i_L$ has become equal to the current value which is calculated by dividing the voltage E by the resistance of the load 105, as shown in FIG. 12 (E), the base current a is supplied again to the transistor 121, as shown in FIG. 12 (A), so that it is made conductive again. Then the current which has been flowing in the loop II is transferred back to the loop I. The load current $i_L$ at this time is equal to the value calculated by dividing the voltage E by the resistance of the load 105 i.e., $i_L=E/R=EG$, which is the steady state value in supplying power to the load 105. The capacitor 104 discharges to the load 105 and at the same time it is charged by electromagnetic energy held in the leakage inductance L during the period from $t_1$ to $t_2$ capacitor voltage does not change significantly, but it is equal to the terminal voltage E of the d.c. power source 101. Accordingly, the application voltage $V_x$ to the load 105 also becomes equal to the voltage E. At time point $t_2$, the voltage and current in the loop I are in the steady states. Accordingly, in the following period until time point $t_3$ when the transistors 121 and 122 on the current path A are cut off at polarity switching of the inverter 115 (see FIG. 12 (A) and (B)), the application voltage $V_x$ to the load 105 does not oscillate, as shown in FIG. 12 (G), and power is supplied steadily to the load.

The next period from $t_3$ to $t_4$ is set as a halt period, in which all base currents a, b, c and d are removed as shown in FIG. 12;(A)–(D) so that the transistors 121 ans 122 on the current path A and the transistors 123 and 124 on another current path B are all cut off, and power supply from the d.c. power source 101 to the load 105 ceases.

At time point $t_4$, the base currents c and d are supplied to the transistors 123 and 124, as shown in FIG. 12 (C) and (D), so that both transistors are made conductive. Then, the current starts flowing through the current path B of the inverter 115. The inverter 115 provide the voltage in polarity opposite to that in the period from $t_o$ to $t_3$, as shown in FIG. 12 (F). In the following period from $t_5$ to $t_6$, the transistor 123 on the current path B is cut off temporarily, and it regains the conductive state at $t_6$. The operation proceeds until time point $t_7$ in the same way as in the period from $t_o$ to $t_3$, and the application voltage $v_x$ to the load 105 is prevented from oscillating.

These operations are repeated, and the application voltage $V_x$ to the load 105 has the full-wave rectification waveform produced at the output of the full-bridge inverter 115 as shown in FIG. 12 (G). Although the application voltage $V_x$ to the load 105 falls slightly when the power transfer is suspended temporarily at polarity switching for the inverter 115, the oscillation which would otherwise occur at polarity switching can be prevented satisfactorily.

As stated previously, the switching control of the switches 121-124 may be performed by any well known timing control circuitry. For example, FIG. 8 shows a switch controller comprising a timing signal generator, for example, a processor and memory, and a drive circuit, to which the known circuit parameters and load parameters are applied for calculating the switching times $t_0$-$t_{11}$.

In the foregoing first embodiment of the invention, the period after the switching device has been made conductive until it is temporarily cut off, i.e., $t_0$-$t_1$, and the duration of the temporary cut off, i.e., $t_1$-$t_2$, in the initial operating cycle need to be set longer than those periods in the following cycles due to different initial conditions of the capacitor 104. Namely, when the inverter 115 starts operating, the capacitor 104 is not charged, but it is charged to the voltage level substantially equal to the steady state voltage E in the second and following cycles.

Figure 13:
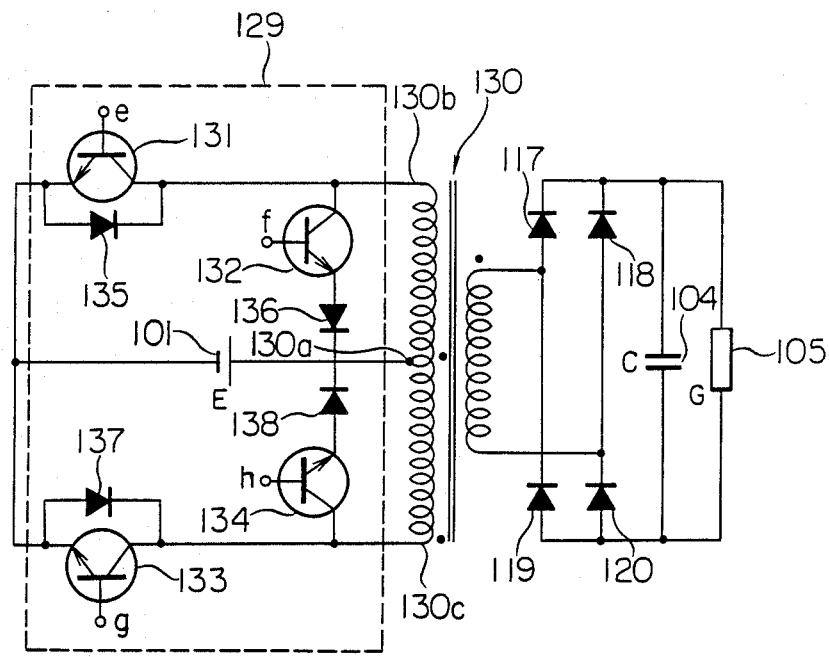
FIG. 13 is a schematic circuit diagram showing the second embodiment of this invention.

FIG. 13 shows the second embodiment of this invention, which differs from the first embodiment of FIG. 10 in that the full-bridge inverter 115 is replaced with a push-pull inverter 129 and the transformer 116 is replaced with a step-up transformer 130 having a center tap 130a. The push-pull inverter 129 is intended to invert d.c. power from the d.c. power source 101 into a.c. power to be provided for the load 105, and it is made up of transistors 131, 132, 133 and 134 which are made conductive by the base current e, f, g and h, respectively, protective diodes 135 and 137 in antiparallel connection across the transistors 131 and 133, and diodes 136 and 138 for providing a reverse voltage withstanding ability for the transistors 132 and 134. The transistors 131 and 132 in pair constitute one current path in the push-pull inverter 129, while the transistor 133 and 134 in pair constitute another current path. The transistor 131 on the current path and the transistor 133 on another current path are activated alternately and cyclically to apply an alternating current to the step-up transformer 130, which transmits the power to the load 105. The push-pull inverter 129 serves for the first and second switches 82 and 88 in the circuit shown in FIG. 8, with the transistor 131 being equivalent to the first switch 82 and the transistor 132 connected between the center tap 130a on the primary winding of the transformer 130 and a terminal 130b on the primary winding being equivalent to the second switch 88.

Figure 14:
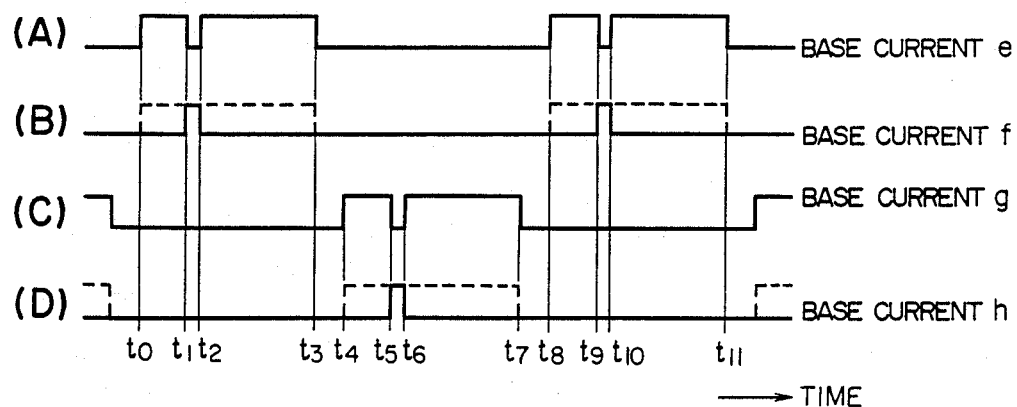
FIG. 14 is a set of timing graphs showing the operation of the circuit arrangement shown in FIG. 13.

Next, the operation of the above circuit arrangement will be described with reference to FIG. 14 showing the timing of the base currents e-h supplied to the transistors 131-134 of the inverter 129.

Initially, at time point $t_0$, the base current e is supplied to the transistor 131, as shown in FIG. 14 (A), and it becomes conductive. This is equivalent to the on-state of the first switch 82 in FIG. 8. Then, the current starts flowing along the route from 101 to 130a to 117 to 104 and 105 in parallel, to 120 to 130b to 131, and back to 101 in FIG. 13, and charging to the capacitor 104 and power supply to the load 105 commence.

At time point $t_1$ when the application voltage to the capacitor 104 and load 105 has become equal to the voltage level which is the voltage of the d.c. power source 101 stepped up or down by the turn ratio of the transformer 130, the base current f is removed, as shown in FIG. 14 (A), so that the transistor 131 is cut off and at the same time the base current f is supplied to the transistor 132, as shown in FIG. 14 (B), so that it is made conductive. This is equivalent to the off-state of the first switch 82 and the on-state of the second switch 88 in FIG. 8. Then, the current is transferred to the route from 130 to 117 to 104 and 105 in parallel, to 120 to 130 to 132 to 136, and back to 130, and power supply from the d.c. power source 101 ceases. During the period from $t_0$ to $t_1$, the load current flowing in the transistor 131 largely exceeds the steady state value as in the case of FIG. 12 (E), but after the time point $t_1$ when power supply from the d.c. power source 101 is cut the load current in the transistor 132 diminishes sharply as in the case shown in FIG. 12 (E).

At time point $t_2$ when the load current flowing in the transistor 132 has become equal to the value calculated by diving he terminal voltage of the d.c. power source 1 by the load resistance in terms of the primary winding of the transformer 130, the base current e is supplied to the transistor 131, as shown in FIG. 14 (A), so that it is made conductive. Then, the diode 136 is reversely biased, and the load current which has been flowing through the transistor 132 and diode 136 is transferred to the transistor 131. The base current f is removed, as shown in FIG. 14 (B), and the transistor 132 is cut off. At this time, the load current flowing out of the d.c. power source 101 reaches the steady state as in the case of FIG. 12 (E), and the application voltage to the load 105 also settles to the steady ttate as in the case of FIG. 12 (G), without transitional events. The application voltage to the load 105 does not oscillate and power is supplied to the load in steady state until time point $t_3$ when the inverter 129 reverses the output polarity.

The following period from $t_3$ to $t_4$ is set as a halt period in which the inverter 19 reverses its output polarity. During the period, all base currents e-h are removed, as shown in FIG. 14 (A)-(D), so that the transistors 131-134 are all cut off, and power supply from the d.c. power source 101 to the load 105 ceases.

At time point t4, the base current g is supplied to the transistor 133 on another current path, as shown in FIG. 14 (C), and it becomes conductive. Then, the inverter 129 starts operating in the opposite output polarity.

In the following period from $t_5$ to $t_6$, the transistor 133 is cut off temporarily and then made conductive again at $t_6$, and the operation proceeds in the same way as in the period from $t_o$ to $t_3$.

These operations are repeated cyclically, and the application voltage to the load 105 has the full-wave rectification waveform produced by the inverter 129, as in the case shown in FIG. 12 (G).

In the foregoing second embodiment of the invention, the base current f of the transistor 132 on one current path or the base current h of the transistor 134 on another current path may be supplied in the same timing profile as that of the base current e of the transistor 131 on one current path or the base current g of the transistor 133 on another current path, as shown by the dashed lines in FIG. 14 (B) and (D), respectively. This is based on the fact that when the transistor 131 or 133 is conductive, the diode 136 or 138 is reversely biased, and the transistor 132 or 134 does not conduct the current even in the presence of the base current f or h.

Figure 15:
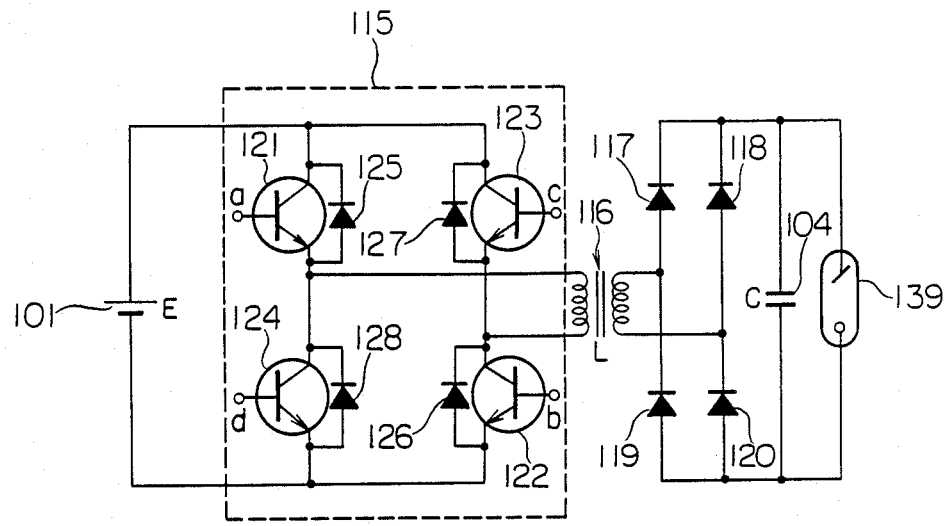
FIG. 15 is a schematic circuit diagram showing the third embodiment of this invention.
Figure 16:
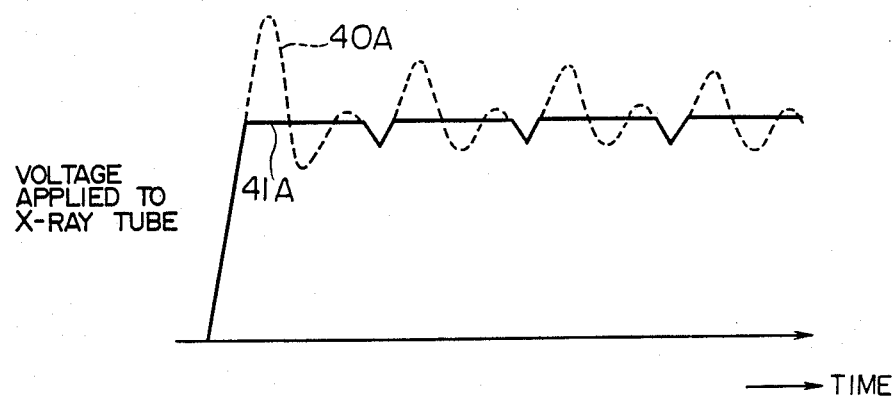
FIG. 16 is a diagram showing the voltage waveform applied to the X-ray tube shown in FIG. 15.

FIG. 15 shows the third embodiment of this invention. The circuit arrangement is derived from the first embodiment shown in FIG. 10 with its load 105 being replaced with an X-ray tube 139, and the operation is exactly the same as shown in the timing graph of FIG. 12. The voltage applied to the X-ray tube 139, i.e., the tube voltage, has the waveform shown in FIG. 16. In contrast to the conventional operating waveform shown by the dashed line 40A, in which the tube voltage overshoots largely at the beginning and thereafter pulsates each time the produced a.c. power reverses the polarity, the waveform achieved by the present invention is rid of overshooting at the start-up, and the oscillation caused by reversing of the inverter output polarity is suppressed satisfactorily. The percent peak-to-peak ripple composition, which has been about 28% in the conventional system with a tube voltage of 100 kV and a tube current of 100 mA, is reduced to about 10% by application of this invention.

As described in the foregoing embodiments, the circuit arrangement having the first switch 82 in series to the d.c. power source 81 is further provided with the second switch 88 across the serial connection of the circuit element 83 having inductance L and the load 85 which is in parallel connection with a capacitor 84, as shown in FIG. 8, and the switches are operated in such a way that the first switch 82 is initially closed and it is opened and the second switch 88 is closed when the application voltage to the load 85 has reached a certain voltage level, and thereafter the second switch 88 is opened and the first switch 82 is closed when the current flowing through the inductive circuit element 83 has reached a certain value, whereby the load application voltage can be prevented from oscillating, while energy causing the voltage overshoot at the commencement of power supply is transmitted to the load 85. The inventive circuit arrangement is capable of suppressing the pulsation of the load application voltage without imposing any additional delay in the rise of the application voltage to a certain voltage level at the commencement of power supply, and it is particularly effective for some types of load 85 where the rise time of application voltage is restricted.

Figure 4:
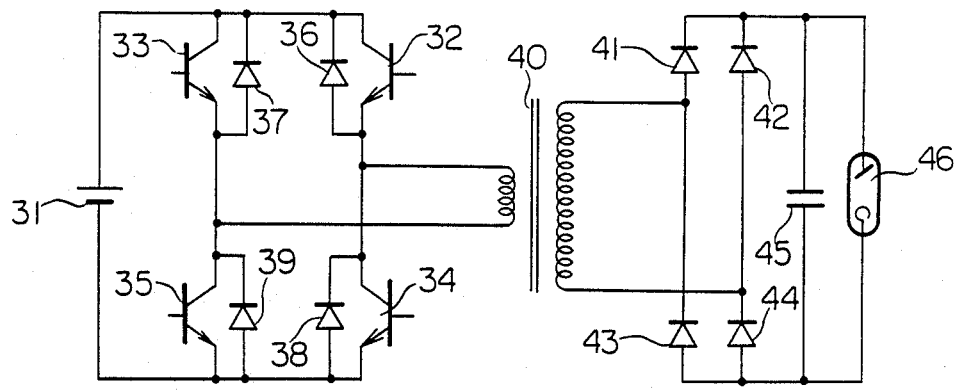
FIG. 4 is a schematic circuit diagram showing the conventional inverter-driven power supply system having a load of an X-ray tube.
Figure 5A:
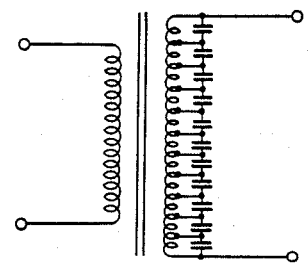
FIGS. 5a to 5d are a set of diagrams showing various equivalent circuits of the step-up transformer shown in FIG. 4.
Figure 5B:
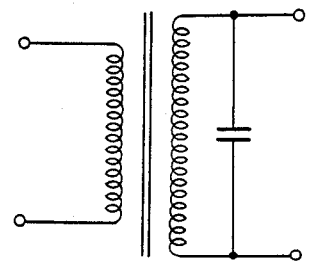
Figure 5C:
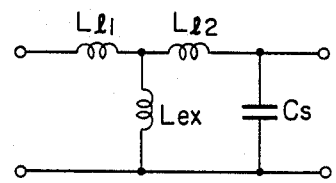
Figure 5D:
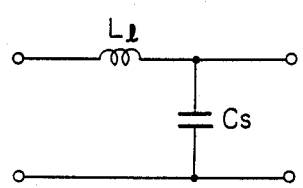
Figure 17:
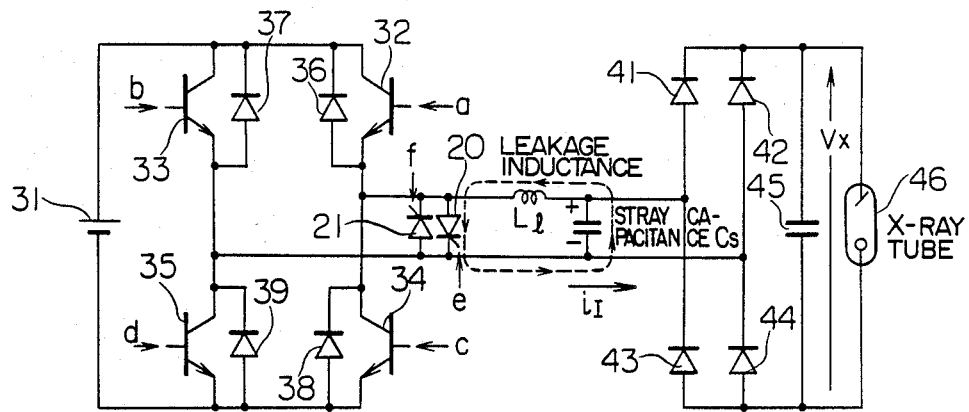
FIG. 17 is a schematic circuit diagram showing the fourth embodiment of this invention.

FIGS. 17 and 118 show the fourth embodiment of this invention, which is again loaded by an X-ray tube. In FIG. 17, components 31-39 and 41-46 are counterparts of FIG. 4, and explanation thereof will be omitted. The circuit arrangement includes a step-up transformer, and it is represented by a leakage inductance $L_l$ and a stray capacitance $C_s$ in the equivalent circuit shown in FIG. 5 (D). Connected across the input of the step-up transformer are thyristors 20 and 21, each of which becomes conductive in response the gate signal and cuts off when the conduction current has decreased below a certain holding current level or when it is biased reversely.

Figure 18:
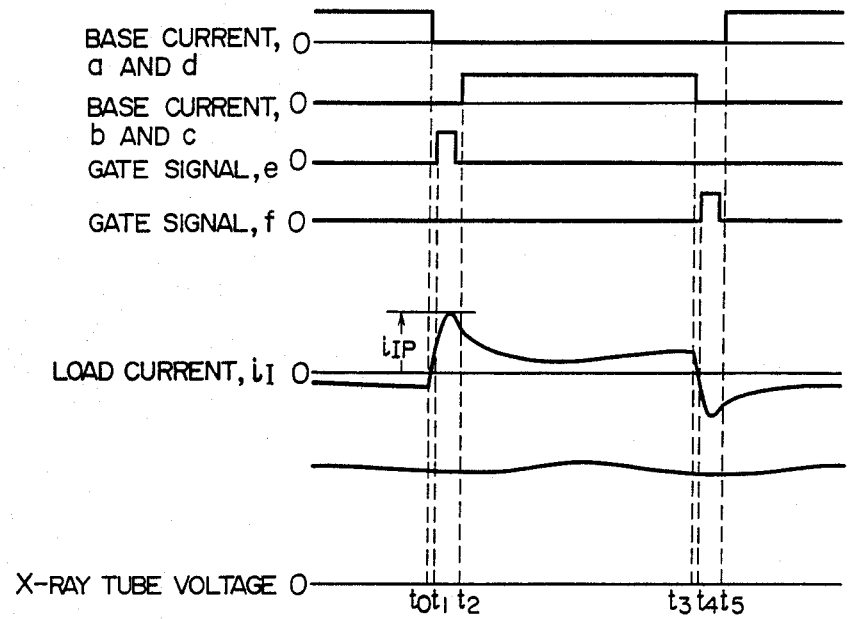
FIG. 18 is a set of timing graphs used to explain the operation of the circuit arrangement shown in FIG. 17.

The operation of the above circuit arrangement will be described with reference to FIG. 18. When the transistors 32 and 35 are made conductive by the base currents a and d, the load current $i_l$ flows along the route from 31 to 32 to $L_l$ to 41 to 45 and 46 in parallel, to 44 to 35, and back to 31, and power is supplied to the load 46. The stray capacitance $C_s$ is charged to have polarity shown in FIG. 17. At time point to when the base currents a and d are removed, causing the transistors 32 and 35 to cut off, the load current $i_l$ falls to zero. Immediately after the load current $i_l$ has gone out, the gate signal e is supplied to the thyristor 20 so that it is turned on at time point $t_l$. Then, the stray capacitance $C_s$ is discharged, and subsequently charged reversely through the route from $C_s$ to $L_l$ to 20, and back to $C_s$. In this operation, the load current $i_l$ has a peak value $i_{lP}$ depending on the voltage V across the stray capacitance $C_s$ as follows.

$$i_{lP} = V\sqrt{\frac{C_s}{L_l}} \qquad (3)$$

Figure 6:
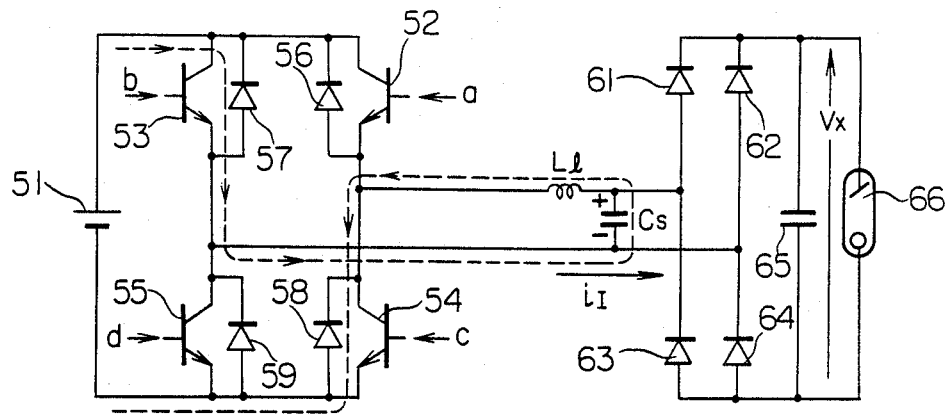
FIG. 6 is a schematic circuit diagram based on FIG. 4 with its transformer being replaced with the equivalent discrete components.
Figure 7:
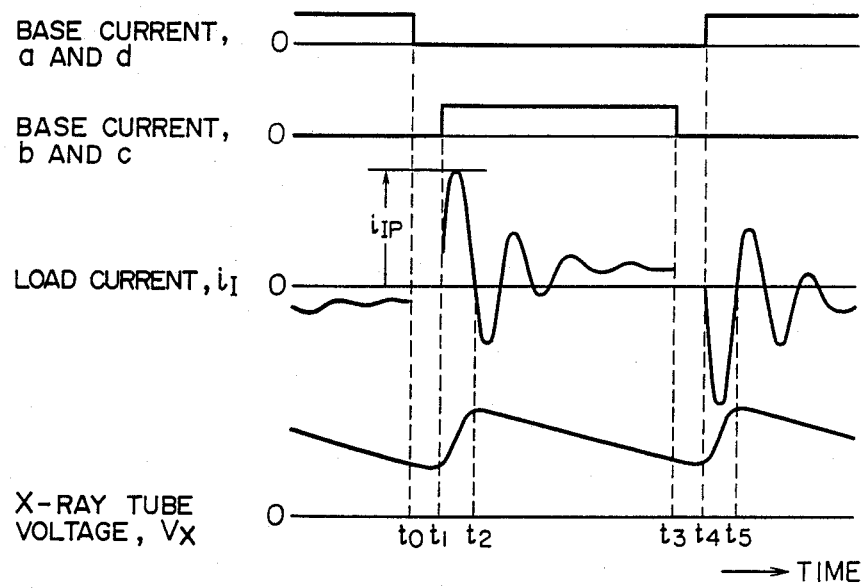
FIG. 7 is a set of timing graphs used to explain the operation of the circuit arrangement shown in FIG. 6.

This is half the value given by Equation (2) in connection with FIGS. 6 and 7, indicating that the peak current can also be reduced.

At time point $t_2$ when the load current has virtually settled, the base currents b and c are supplied so that the transistors 33 and 34 become conductive. The stray capacitance $C_s$ is already charged reversely, and the load current $i_l$ flows along the route from 31 to 33 to 42 to 45 and 46 in parallel, to 43 to $L_l$ to 34, and back to 31 without significant pulsation. Consequently, the voltage originating from the d.c. power source 31 and stepped up by the factor substantially equal to the turn ratio of the transformer is applied to the X-ray tube 46 and the electrostatic capacity 45 existing on the high tension cable. The thyuristor 20 is turned off by being reversely biased through the transistors 33 and 34 which have become conductive.

As described above, the fourth embodiment allows the stray capacitance of the step-up transformer to be charged reversely during the halt period of the inverter operation, preventing the load current from oscillating at the start-up of inverter operation, weereby a stable tube voltage with little pulsation can be obtained. Moreover, the transient current caused by the leakage inductance $L_l$ and stray capacitance $C_s$ does not flow into the inverter, and the transistors 32-35 need not have the excessive current capacity in addition to the load current.

Figure 19:
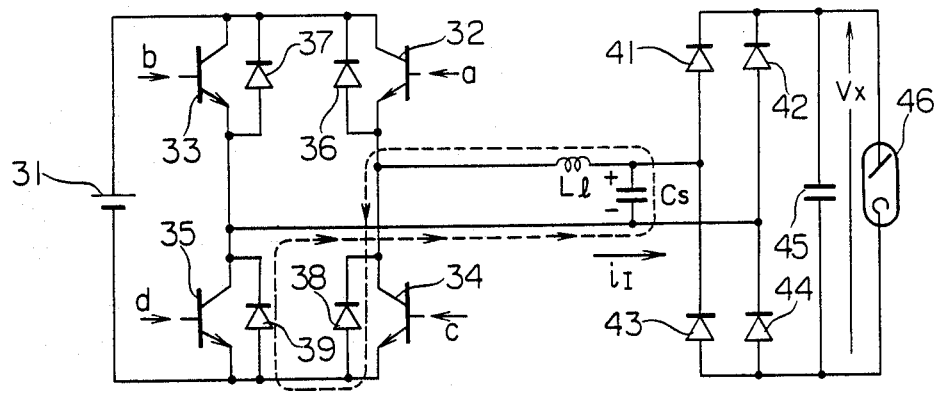
FIG. 19 is a schematic circuit diagram showing the fifth embodiment of this invention.

FIG. 19 shows the fifth embodiment of this invention. Components 31-39 and 41-46 are identical to those shown in FIG. 4, and explanation thereof will be omitted. The system includes a step-up transformer having a leakage inductance $L_l$ and stray capacitance $C_s$.

Figure 20:
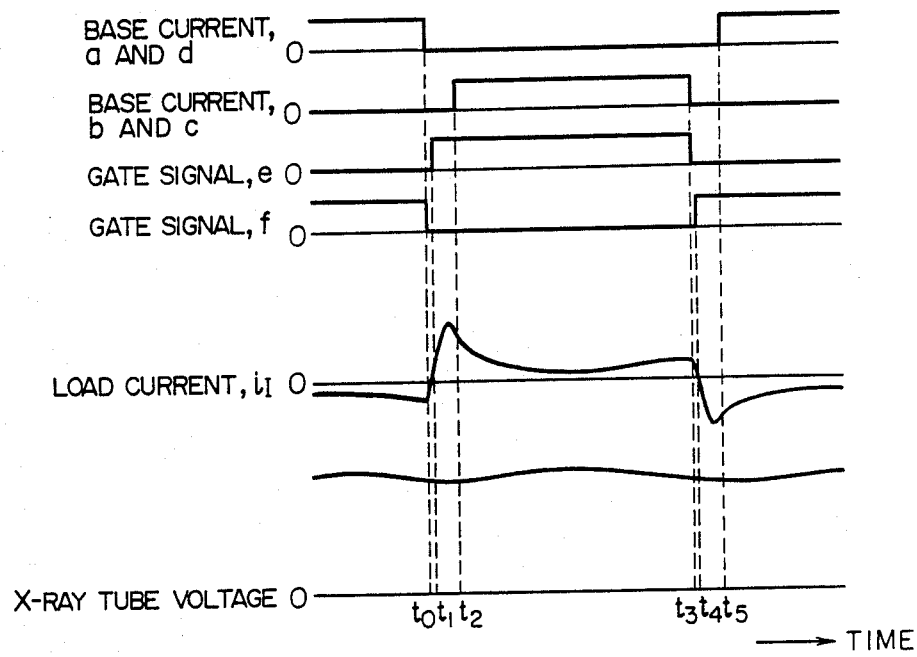
FIG. 20 is a set of timing graphs used to explain the operation of the circuit arrangement shown in FIG. 19.

The operation of the above circuit arrangement will be described with reference to FIG. 20. When the transistors 32 and 35 are made conductive by the base currents a and d, the load current $i_l$ flows along the route from 31 to 32 to $L_l$ to 11 to 45 and 46 in parallel, to 44 to 35, and back to 31, and power is supplied to the load 46. The stray capacitance $C_s$ is charged $t_o$ have polarity shown in FIG. 19. At time point to when the base currents a and d cease, causing the transistors 32 and 35 to cut off, the load current $i_l$ falls to zero. Immediately after the load current $i_l$ has gone out, the gate signal e is supplied at time point $t_1$ the transistor 34 conductive, the stray capacitance $C_s$ is discharged through the route from $C_s$ to $L_l$ to 34 to 39, and back to $C_s$, until it is reverely charged. At this time, the transient current has a peak value $i_{lP}$ which is estimated by Equation (3) as in the case of the fourth embodiment shown in FIG. 17. At time point $t_2$ when the current pulsation has virtually subsided, the base current b is supplied to make the transistor 33 conductive. The stray capacitance $C_s$ is already charged reversely, and the load current $i_l$ flows along the route from 31 to 33 to 42 to 45 and 46 in parallel, to 43 to L_l to 34, and back to 31 without noticeable bounce. Accordingly, the voltage substantially equal to the terminal voltage of the d.c. power source stepped up by the turn ratio of the transformer is applied to the X-ray tube 46 and electrostatic capacity 45 existing on the high tension cable.

As described above, the embodiment shown in FIG. 19 allows he stray capacitance of the step-up transformer to be charged reversely during the halt period of the inverter, preventing the load current from oscillating at the start-up of the inverter operation, whereby a stable tube voltage with little pulsation can be obtained, as in the case of the previous embodiment shown in FIG. 17. Moreover, this embodiment doesnot necessitate additional circuit components, and can be practiced by solely using the inverter control signals.

Figure 21:
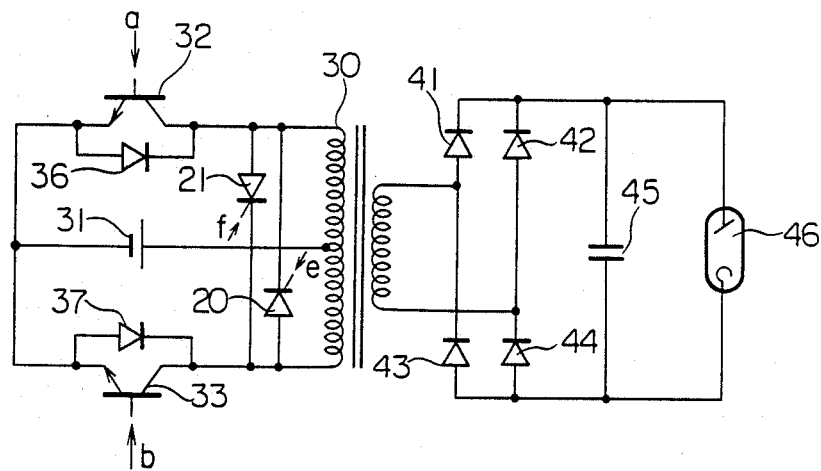
FIG. 21 is a schematic circuit diagram showing the sixth embodiment of this invention.

FIG. 21 shows the sixth embodiment of this invention. This embodiment is intenddd to apply to a push-pull inverter. Components 31–33, 36, 37 and 41–46 are identifcal to those shown in FIG. 4 and components 20 and 21 are identical to those shown in FIG. 17, and explanation thereof will be omitted. Reference number 30 denotes a step-up transformer having a center tap on the primary winding, and the transformer is connected to the output of the push-pull inverter.

The operation of the above circuit arrangement is as follows. The inverter operates by making the transistors 32 and 33 conductive alternately and cyclically. The reversal for the charging polarity of theh stray capacitance of the step-up transformer 30 is impelemented using the thyristors 20 and 21. The thyristor 21 is turned on in the period after the transistor 33 has cut off until the transistor 32 becomes conductive so as to reverse the charging polarity, and the thyristor 20 is turned on in the period after the transistor 32 has cut off until te transistor 33 becomes conductive so as to reverse the charging polarity of the stray capacitance.

These operations allow the stray capacitance of the step-up transformer to be charged reversely uuring the halt period of the inverter, preventing the load current from oscillating at the start-up of the inverter, whereby a stable tube voltage with little pulsation can be obtained as in the preceding embodiments.

Figure 22:
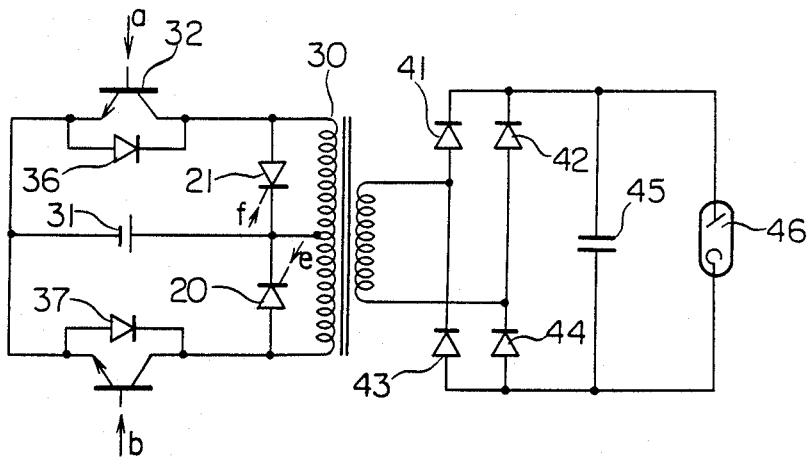
FIG. 22 is a schematic circuit diagram showing the seventh embodiment of this invention.

FIG. 22 shows the seventh embodiment of this invention. This embodiment is alsso intended to apply to a push-pull inverter, as of the previous embodiment shown in FIG. 21, and both circuit arrangements consist of the same components. The arrangement of FIG. 22 differs from FIG. 21 in the connecting manner for the thyristors 20 and 21. The thyristors 20 and 21 in FIG. 21 are connected together in antiparallel fashion across the primary winding of the step-up transformer 30, whereas those in FIG. 22 are connected separately between the center tap and the opposite ends of the winding. The operation of the arrangement is identical to the embodiment of FIG. 21, with the result of substantially the same effectiveness. A difference is that the voltage applied to the thyristors 20 and 21 is half the voltage in the case of FIG. 21, and the current flowing in the thyristors 20 and 21 is twice as much as that in the case of FIG. 21.

The present invention is not limited to the foregoing embodiments, but is applicable extensively to various types of inverter system with the results of the same effectiveness.

The inventive inverter-driven X-ray generator allows the stray capacitance of the step-up transformer to be charged reversely during the halt period of the inverter, preventing the load current from oscillating at the start-up of the inverter, whereby a stable tube voltage with little pulsation can be obtained.

We claim:

1. A method of operating a power supply system having a d.c. power source, an inductive circuit element, a parallel connection of a capacitor and a load, a first switch connected in series with said d.c. power source, and a second switch connected in parallel with a serial connection of said inductive circuit element and said parallel connection of said capacitor and said load, the method including controlling the switching of said first and second switches to supply a voltage from said d.c. power source through said inductive circuit element to said load, the method comprising the steps of:
   closing said first switch so as to apply said voltage to said load;
   opening said first switch when said voltage reaches a predetermined voltage of said d.c. power source;
   closing said second switch at the same time said first switch is opened;
   opening said second switch when a current flowing in said inductive circuit element becomes substantially equal to a predetermined current value; and
   closing said first switch at the same time said second switch is opened.

2. A method according to claim 1, wherein said first and second switches are arranged as a full bridge inverter and the step of closing said first switch provides a serial connection of said d.c. power supply to said load in the inverting operation of said inverter.

3. A method according to claim 1, wherein said first and second switches are arranged as a full-bridge inverter, said first switch being disposed in a first current path for making a serial connection with said d.c. power supply to said load in the inverting operation of said inverter, said second switch including a diode connected in antiparallel therewith and being disposed in a second current path in parallel connection with said first switch in said first current path.

4. A method according to claim 1, wherein said first and second switches comprise a push-pull inverter and said inductive circuit element comprises a center-tapped transformer, said second switch being connected between the center tap and one end of the primary winding of said transformer.

5. A method according to claim 1, wherein said load comprises an X-ray tube.

* * * * *